UNITED STATES PATENT OFFICE.

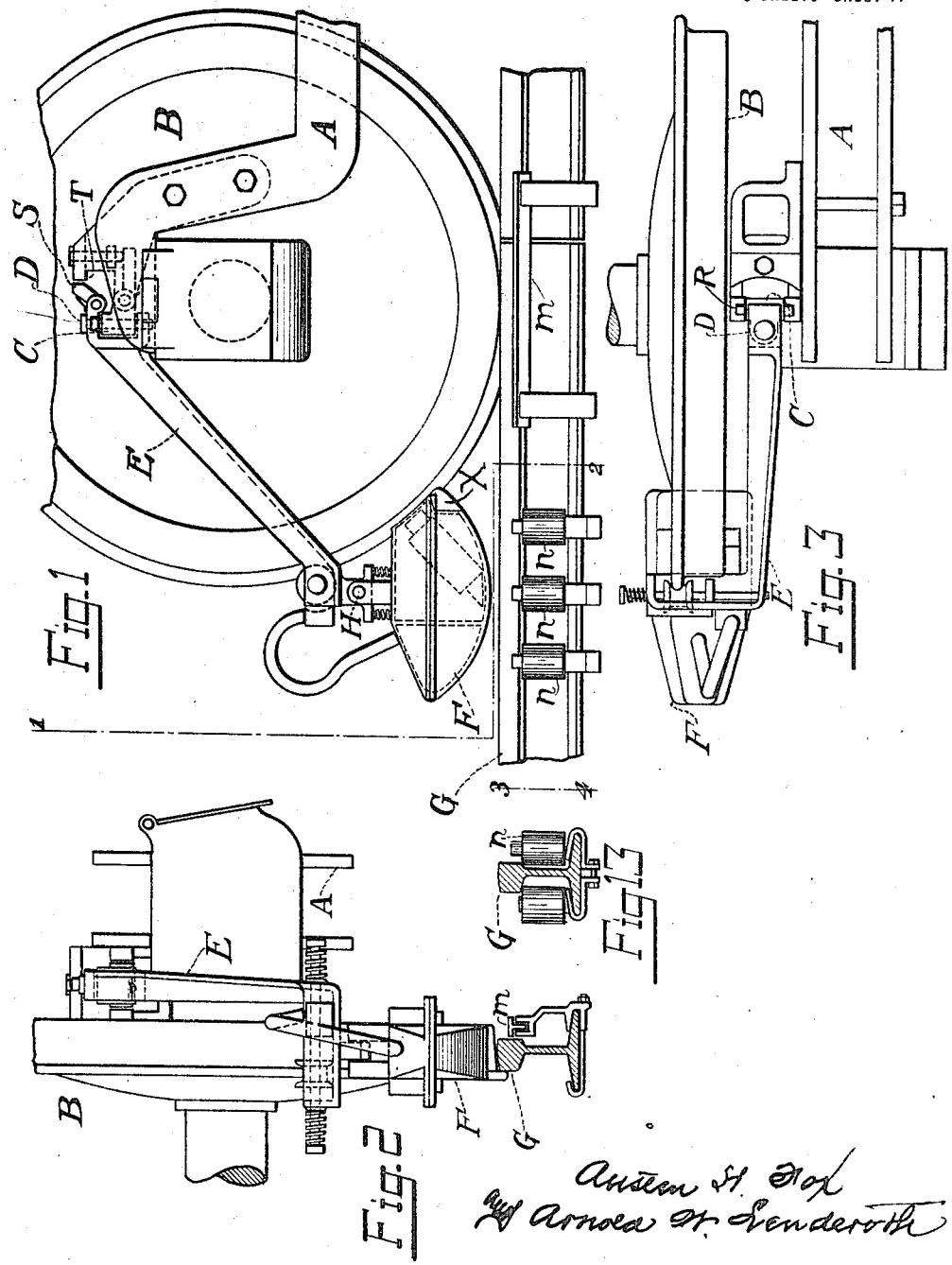

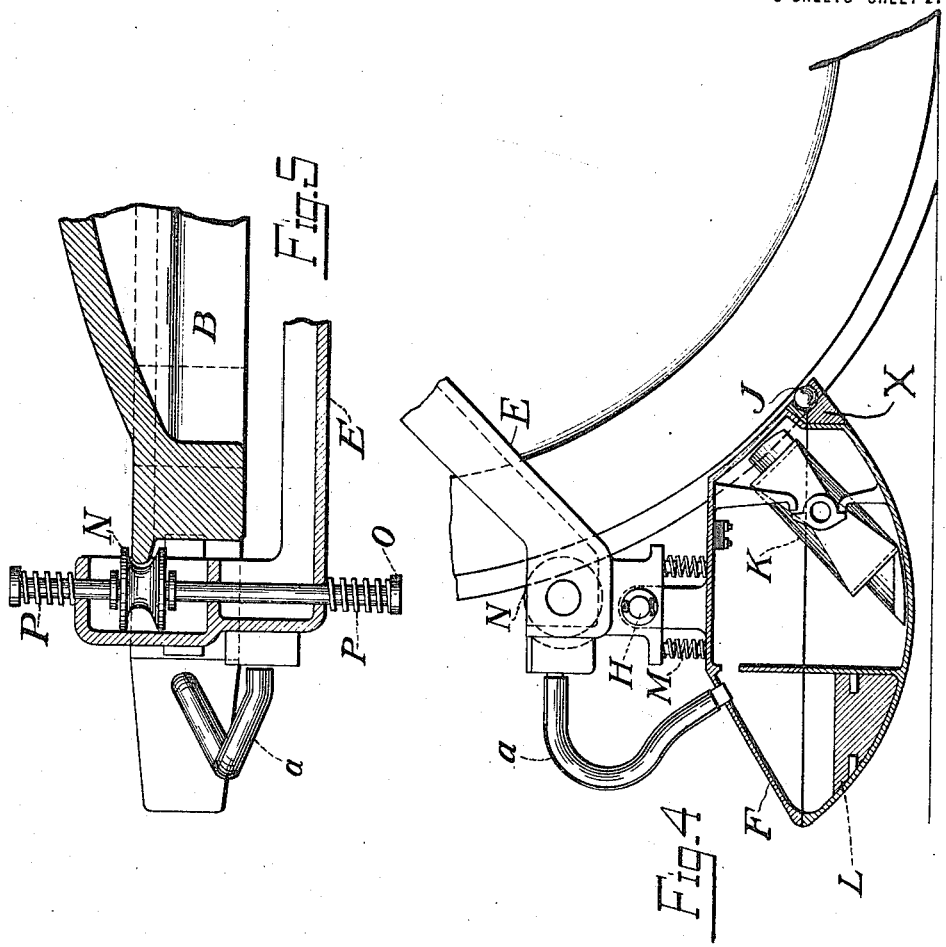

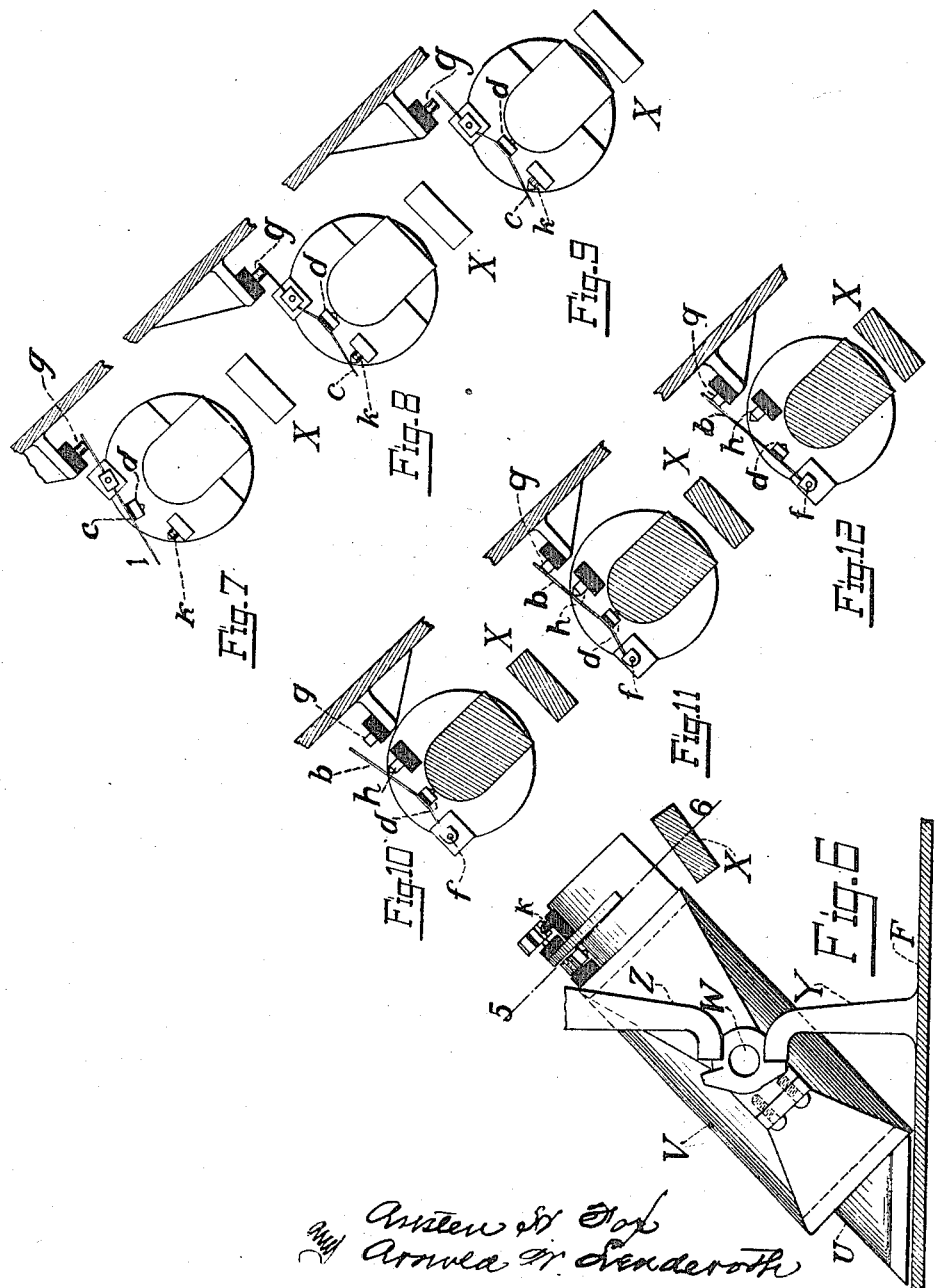

AUSTEN H. FOX, OF NEW YORK, AND ARNOLD W. LENDEROTH, OF STAPLETON, NEW YORK.

MAGNETIC CONTROLLING DEVICE FOR RAILWAYS.

1,261,376. Specification of Letters Patent. Patented Apr. 2, 1918.

Application filed November 8, 1915. Serial No. 60,234.

*To all whom it may concern:*

Be it known that we, AUSTEN H. Fox and ARNOLD W. LENDEROTH, both citizens of the United States, residing, respectively, at New York, in the county and State of New York, and Stapleton, county of Richmond, and State of New York, have invented certain new and useful Improvements in Magnetic Controlling Devices for Railways, of which the following is a full, clear, and exact description.

The invention for which we now present this application for Letters Patent is an improvement in the system or apparatus heretofore devised by us and made the subject of numerous applications, and which belongs to the general class of signaling or controlling devices for use in connection with any kind or type of railway.

In a former application filed by us on April 30, 1915, Serial No. 24,881, we have shown and described a form of detector magnet for this purpose, from the practical use of which we were led to devising the form of apparatus which will be described herein, and by reference to which the highly useful and important character of our present improvements will be more readily seen and appreciated.

For a better understanding of the specific objects which we have in view, it may be stated that the present improvements contemplate the use on a traveling vehicle of an electromagnet with a straight or single core, one pole of which is normally in proximity to one of the rails of a track, so that the position of the magnet will be determined by the attractive effect existing between it and the track rails. The magnet is carried in a box or casing of peculiar or suitable construction, and is so placed with reference to one of the iron wheels of the vehicle that its magnetic circuit will be completed not only through the track and itself, but also through the wheel.

This magnet, according to its position, that is to say whether attracted toward the rail or shifted by the attraction therefor of another mass of magnetic material, controls certain circuits on the vehicle which, in general, indicate by the condition of suitable translating devices therein, the position of the magnet, or which may be made to govern or otherwise affect the speed of the vehicle, according to such positions.

The track, normally and usually of carbon steel rails, is magnetic, and serves as an armature for the magnet which is usually excited by an ordinary coil carrying a suitable current, but for purposes of the case, whether for signaling or giving any other specific indications the magnetic continuity of this rail is interrupted at the desired points and for sections of predetermined length, by the interposition of parts of a single or one or more rails of manganese steel, which is substantially non-magnetic, and which when traversed by the vehicle permits the electromagnet to shift its position by reason of the presence of another armature near its opposite end, and the cessation of magnetic attraction by the rail, and by the accompanying change of position to give the prearranged indications or signals.

This principle of operation, it is unnecessary to say, may be carried out in many ways, for various purposes and with widely different results, but for purposes of the present case the above simple explanation of operation will suffice for a full understanding of those features of construction and operation in which this invention resides.

In the drawings hereto annexed,

Figure 1 is a view in side elevation of a car wheel and part of a truck equipped with our improvement, a portion of the track being shown.

Fig. 2 is an end view of the same parts.

Fig. 3 is a top view of the devices of Fig. 1.

Fig. 4 is an enlarged view, partly in section, showing the construction of our improved device.

Fig. 5 is a part sectional view of a means for adjusting the magnet case to operative condition with reference to the car wheel.

Fig. 6 is an enlarged view in elevation of our new form of electromagnet.

Figs. 7 to 12 are detail views illustrating the different conditions or relations of parts of two circuit-controlling mechanisms operated by the electromagnet, and Fig. 13 is a sectional view of a portion of the track with electromagnets associated therewith for a purpose hereinafter indicated.

To any suitable or convenient point of a car truck A, preferably over the axle of a wheel B and depending in the rear of said wheel, is pivotally secured, with the capability of movement in a horizontal and also in a vertical plane, an arm E. The specific means which we employ for this purpose is a vertical pin D secured to a block C which is pivoted to a portion of the truck frame A, and on which the upper end of the arm E is mounted. This arm supports a detector magnet box F in a position close to the wheel and one of the rails G of the track.

The box or casing F, as shown more clearly in Fig. 4, is pivotally supported by means of a stud H from the arm E, and lies, as shown in Fig. 5, directly in line with the wheel B, one end being supported in very close proximity to the tread thereof. The material of this casing is non-magnetic and its shape is a matter largely of design, but for practical reasons the lower portion should be wide enough to accommodate at one side an electromagnetic core and coil K and at the other a balancing weight L. In order to maintain the box in position as nearly as possible, springs M are interposed between the same and the supporting arms which take up the strains and shocks tending to rock or shift the box in the plane of the wheel.

In order also to keep the casing as nearly as practicable in the plane of the wheel, particularly when the wheel is running on sharp curves, a grooved wheel N engaging with the wheel flange, is mounted on a horizontal rod O, which passes through bearings in the extended end of the supporting arm E and has heads at its ends between which and the sides of the arm are stout spiral springs P. Any tendency therefore for the arm and the casing attached to it to shift position relatively to the wheel flange is arrested by the action of these springs. The extent of such movement, out of line with the wheel, is, however, limited by stops or blocks R on the truck between which the pivoted end of the arm E extends, as shown in Fig. 3.

As the arm E is pivoted to the truck frame to permit its movement in a vertical plane, the casing F will be raised should the car become derailed or should it encounter any obstruction on the track or be otherwise struck or pushed upward. Slight displacements of this character are immediately corrected by gravity, but our experience leads us to adopt means for retaining the box or casing in a raised position in case it should be moved through too great an arc, so that the personal attention of the engineer will be required to restore it to normal position.

We therefore provide a catch S on the arm E that will pass under and engage a stop T on the truck frame, and thus hold the arm E up in case it has been raised beyond a certain limit.

The electromagnet is shown in detail in Figs. 4 and 6. It comprises a straight core U wound with a coil V, the whole pivoted at a point W on a support attached to the casing F and is substantially balanced in this position. The lower end of the core is shaped to present a substantially flat surface to the bottom of the casing, and hence to the rail under it, and the other end is extended beyond the coil close to the wheel and over a properly proportional magnetic mass X in the bottom of the casing.

Stops Y and Z are secured within the casing, one to check the movement of the core toward the rail, the other to stop it before it reaches the magnetic mass X, and generally, some antifriction devices, such as balls J, are set in the casing at points which most closely approach the wheel, so that in case of contact between the two due to shocks or jars, no deleterious results will follow.

The magnet core when energized is normally attracted to the rail by a preponderating force, and hence the upper end is removed to the full extent from the magnetic mass X. But this mass is so proportioned that when the magnetic continuity of the rail is interrupted to a given extent or for a given time, the magnet as a whole, which is antifrictionally mounted, swings over, bringing the upper end into closer relation with the mass X. The core therefore has two normal positions, one with the lower end close to the rail and the other with the upper end close to the armature X, and these positions may be secured and maintained or modified by any known means indicated, for example, in Figs. 1, 2 and 13, which show magnetic or non-magnetic sections m, as the case may be, adjacent the rail, or series of electromagnets n placed on one or both sides of the rail for exerting different effects upon the lower end of the magnet core. For purposes of the present case, however, these devices may be disregarded as they are used only in special cases and for special reasons.

Through a flexible conduit a conductors are run from the vehicle down the arm E and into the casing F. Through these current is led that energizes the magnetic core and controls the indicating or other devices on the vehicle by means actuated by the core in its movements, and for an explanation of these latter reference is made to Figs. 7 to 12.

The upper projecting end of the core carries two switch or circuit controlling devices b, c. Each of these devices comprises a flexible conducting strip carrying a soft iron block d and adapted to make contact with one or more points or terminals.

In Figs. 10, 11 and 12, which are sections through the end of the core, the strip b is supported on a stud *f* on the core and if its soft iron block is not attracted by the core, which happens when the core is close to armature X and the block *d* is lifted away from the core by the engagement of spring *b* with a stop on the casing, it assumes a position shown in Fig. 12, in which the strip bridges the support *f* and the stop *g*, but is out of contact with the terminal stop *h*.

If, however, the block *d* is strongly attracted by the core, as when the end of the core is remote from X and the block is allowed to approach the core by the position of the core, then the relations of the parts are as shown in Fig. 10, in which the strip is out of contact with the stop *d* but drawn down into contact with the stop *h*.

In the intermediate position where the attraction for the block *d* is between the above two limits and the pull on the strip is not so pronounced, the strip *b* may touch both stops *g* and *h*, the relative position of the core and the armature X permitting this.

The position of the core with reference to the rail may by this means be indicated by a lamp on the moving vehicle which is in a circuit from the stop *h* and lighted so long as the core is drawn down to the rail, but cut out of circuit when this position is changed.

It is equally essential that another lamp or lamps should be illuminated when the core is attracted by the armature X, for which purpose the second switch strip *c* is used. The converse operation of this switch to that marked *b* being required, the position of its pivoted supporting point with reference to the stop *g* on the casing must be changed. For example, in Fig. 7 when the core is most remote from the armature X the strip *c* conspires to hold the block *d* away from the core, hence the contact with stop *k* which would light the lamps indicating the abnormal condition or position of the core is broken.

On the other hand, when the core is close to the armature X the spring strip is withdrawn from stop *g* and the block *d* allowed to come against the core, which closes the circuit to stop *k* and indicates that the core is in this position. The conditions peculiar to the intermediate stage of movement are indicated in Fig. 8.

From the above arrangement it is manifest that by the condition of the lamps on the vehicle the operator can tell at a glance whether the core is attracted to the rail, which would be its normal position, or to the armature X, which would indicate a break in the magnetic continuity of the rail, or to neither position, when both sets of lamps would continue lighted, and by such conditions, by means of properly constructed apparatus, the necessary operations may be effected or the engineer advised of the situation.

The arrangement of magnet herein shown is much superior to any other of which we are aware. Its movement is quick and certain and the operation of the circuit controlling devices connected with it is not interfered with by ordinary shocks or jars. The precautions used to prevent injury or improper action in case of undue shocks, jars, derailment or other accidents is substantially complete.

What we claim is:

1. In a railway signaling or indicating mechanism, the combination with a car truck frame, of an arm depending therefrom, a detector magnet casing carried by the arm in close proximity to the periphery of a car wheel and the rail, the arm being pivotally connected to the truck frame so as to be movable in a vertical plane and capable of limited movement transversely to the plane of the wheel.

2. In a railway signaling or indicating mechanism, the combination with a car truck frame, of an arm depending therefrom, a detector magnet casing carried by the arm in close proximity to the periphery of a car wheel and the rail, the arm being pivotally connected with the truck frame so as to be movable in a vertical plane, and a catch for retaining the arm in a raised position when it has moved beyond a certain limit.

3. In a railway signaling or indicating mechanism, the combination with a truck frame, of an arm depending therefrom, a detector magnet casing carried by said arm in close proximity to a car wheel and the rail, the arm being capable of limited movement transversely to the plane of the wheel and means engaging with the car wheel connected to the end of the arm by spring connections whereby tendency of the arm to move transversely to the car wheel is resisted by the springs.

4. In a railway signaling or indicating mechanism, the combination with a truck frame, of an arm depending therefrom, a detector magnet casing carried by said arm in close proximity to a car wheel and the rail, the arm being capable of movement transversely to the plane of the wheel, and a grooved wheel engaging with the car wheel and spring connections between the supports for said wheel and the end of the depending arm.

5. The combination with a moving vehicle, of a detector magnet casing carried thereby in close proximity to the track, a detector magnet mounted therein with one end near the track, an armature supported in the casing in the vicinity of the other end, said magnet being substantially balanced in its supports, and circuit-controlling mechanism operated by a change in the position of the magnet due to changes in the magnetic conditions of the track.

6. The combination with a moving vehicle, of a detector magnet casing supported thereby in proximity to a magnetic rail of the track, a detector magnet core therein centrally supported and balanced in a substantially upright position, the lower end near the track, a proportional mass of magnetic material in the casing near the upper end and circuit controlling devices operated by the shifting of the magnet to and from the track and from and toward the magnetic mass.

7. The combination with a moving vehicle, of a detector magnet casing pivotally supported thereby close to a magnetic track rail, springs for absorbing shocks imparted to the casing and tending to move it on its support, a detector magnet in one end of the casing balanced on its supports so as to move toward or from the rail, a counter-balancing weight in the other side of the casing and circuit controlling devices operated by the movements of the detector magnet.

8. The combination with a car truck frame, of an arm pivotally attached thereto, a detector magnet casing carried at the end of the arm immediately over the track and close to the rear of the car wheel, a balanced detector magnet therein, one end adapted to be swung toward the track, and a proportional mass of magnetic material near the other end, whereby the magnet will shift its position when the attraction between it and the track rail ceases.

9. The combination with a car truck frame, of an arm pivotally depending therefrom, a detector magnet casing at the end of the arm and near the rail of the track, a grooved wheel spanning the flange of the car wheel and a rod connected transversely to the arm by springs upon which rod said grooved wheel is mounted.

10. The combination with a moving vehicle, of a detector magnet casing supported thereby in close proximity to a wheel and to one of the rails of the track, a detector magnet balanced therein so that one of its poles may swing toward or from the track rail, stops for limiting such movements of the magnet in both directions and circuit controlling mechanism operated by the movable magnet.

11. The combination with a moving vehicle, of a detector magnet casing carried thereby in close proximity to a wheel and to one of the rails of the track, a pivotally supported and balanced magnet within the casing capable of swinging in a vertical plane toward or from the rail, an armature within the casing exerting an attractive effect on the magnet core and moving the same toward it when that of the rail ceases, and circuit controlling devices operated by the movement of the magnet to indicate the two positions of the same due to the attraction of the rail and of said armature.

In testimony whereof we affix our signatures.

AUSTEN H. FOX.
ARNOLD W. LENDEROTH.

Copies of this patent may be obtained for five cents each, by addressing the "Commissioner of Patents, Washington, D. C."